(12) United States Patent
Nagano

(10) Patent No.: US 6,964,491 B2
(45) Date of Patent: Nov. 15, 2005

(54) GAMING MACHINE

(75) Inventor: Hiroyuki Nagano, Koutou-ku (JP)

(73) Assignee: Aruze Corp., Tokyo (JP)

( * ) Notice: Subject to any disclaimer, the term of this patent is extended or adjusted under 35 U.S.C. 154(b) by 76 days.

(21) Appl. No.: 10/696,031

(22) Filed: Oct. 30, 2003

(65) Prior Publication Data
US 2004/0090155 A1 May 13, 2004

(30) Foreign Application Priority Data
Oct. 30, 2002 (JP) .............................. 2002-316728

(51) Int. Cl.[7] ............................................. F21V 33/00

(52) U.S. Cl. ..................... 362/89; 362/253; 362/806; 312/234; 312/223.1; 273/138.1; 463/46

(58) Field of Search ......................... 362/89, 253, 806; 312/234, 223.1; 273/138.1; 463/46

(56) References Cited

U.S. PATENT DOCUMENTS 6,820,875 B1 * 11/2004 Hedrick et al. .......... 273/138.1
2002/0107067 A1 8/2002 McGlone et al.

FOREIGN PATENT DOCUMENTS

| JP | 8-131610 | 5/1996 |
|----|----------|--------|
| JP | 11-216226 | 8/1999 |
| JP | 2001-631 | 1/2001 |
| JP | 2002-28281 | 1/2002 |
| WO | WO 01/34262 | 11/2000 |

* cited by examiner

Primary Examiner—Thomas M. Sember
Assistant Examiner—James W Cranson, Jr.
(74) Attorney, Agent, or Firm—Leydig, Voit & Mayer, Ltd.

(57) ABSTRACT

A gaming machine in which the number of parts for securing a decorative panel is small, so the decorative panel is easy to attach and detach. A frame supports a decorative panel from a front face of the decorative panel. The frame is detachably attached to a door. The door is provided with a support part for supporting the decorative panel from a rear face of the decorative panel. When the frame is secured to the door, the decorative panel is held between the frame and the support part.

10 Claims, 5 Drawing Sheets

GAMING MACHINE

CROSS REFERENCE TO RELATED APPLICATIONS

This application is based upon and claims the benefit of priority from the prior Japanese Patent Applications No. 2002-316728, filed on Oct. 30, 2002; the entire contents of which are incorporated herein by reference.

BACKGROUND OF THE INVENTION

1. Field of the Invention

The present invention relates to a gaming machine.

2. Related Background Art

In general, slot machines, video slot machines, and the like placed in casinos and arcades are provided with decorations by which kinds of gaming machines are discernible at a glance even from a distance. However, decorating a cabinet itself is problematic in that the cabinet loses its versatility, so that it fails to be reused, increases the manufacturing cost, and so forth. Therefore, in this regard, many gaming machines are decorated such that a semitransparent decorative panel is fitted therein and electrically illuminated from behind so as to make designs formed on the panel visible.

Specifically, a console to be operated by gamers and a display unit for displaying details of games are disposed at a position relatively close to the eye level of gamers, whereas the above-mentioned decorative panel is incorporated above and/or below these units.

Conventionally, such a decorative panel had been fixed beforehand to a frame covering surroundings of the decorative panel, and then the frame has been attached to a gaming machine (see, for example, Japanese Patent Application Laid-Open No. 2001-631). Examples of methods for mounting the frame to the gaming machine include those fitting individual sides of the frame into the gaming machine, those attaching the frame to the gaming machine in a door-like fashion, etc.

SUMMARY OF THE INVENTION

However, decorative panels are often illuminated with a light source from behind for their decoration. The illuminated parts do not employ aggregates and the like for increasing the strength of the panel and are relatively easy to break. Therefore, the decorative panel must be replaced alone when broken.

On the other hand, though the cabinet of such a gaming machine is often reused as it is as mentioned above, its decorative panel must be replaced if a different game is to be installed therein.

For securing the above-mentioned decorative panel to a frame beforehand, however, the decorative panel must be fastened with screws and the like at its peripheral parts in contact with the frame.

Therefore, it takes too much time and trouble to remove and attach the decorative panel, and requires a large number of parts for attachment. These parts and manpower in operations have been expensive.

In view of the foregoing problems, it is an object of the present invention to provide a gaming machine in which the number of parts for securing a decorative panel is small, whereas the decorative panel is easy to attach thereto and detach therefrom.

The gaming machine in accordance with the present invention comprises a cabinet; a light source disposed within the cabinet; a decorative panel, disposed in front of the light source, including one surface for receiving light from the light source; support means, provided with the cabinet, for supporting the decorative panel from the one surface; and a frame, detachably attached to the cabinet, including a back face for supporting the decorative panel from the other surface thereof opposite from the one surface in a state where the frame is secured to the cabinet.

When the frame is fixed to the cabinet in this configuration, the decorative panel is supported by the frame and the support means, whereby no parts for securing the decorative panel to the frame are necessary. This can reduce the cost of parts and the time and trouble to replace the decorative panel.

In conventional gaming machines, a decorative panel had been fixed beforehand with screws and the like to a frame for securing the decorative panel, and then the frame has been secured to the cabinet so that the decorative panel is mounted to the cabinet. However, such a configuration requires a large number of parts for securing the decorative panel and the frame to each other. Further, the decorative panel has been very hard to remove and attach when needed to be replaced.

Therefore, the present invention is configured such that the decorative panel is not fixed to the frame beforehand, but is secured as being held between the frame and the cabinet at the time when fixing the frame to the cabinet. This configuration necessitates few parts for securing the decorative panel to the frame. Also, it allows the decorative panel to be replaced quite easily.

Preferably, in the gaming machine of the present invention, the support means supports the decorative panel while in a state in contact with only a peripheral part of the one surface of the decorative panel.

This configuration makes it possible to support the decorative panel by the peripheral part thereof alone, whereby functions of the decorative panel can fully be exhibited without blocking the light illuminating the decorative panel from the light source.

Preferably, in the gaming machine of the present invention, the frame further comprises panel safety means, disposed at a position opposing a bottom end of the decorative panel, for preventing the decorative panel from dropping out.

Since the frame is provided with panel safety means for preventing the decorative panel from dropping out, the decorative panel does not drop out even when the frame is not secured to the cabinet. Therefore, the decorative panel can be prevented from breaking because of dropping and the like. As a consequence, operations for opening/closing the frame for replacing the decorative panel and the light source, etc., can be carried out safely.

Preferably, in the gaming machine of the present invention, the frame is formed with an insertion opening for receiving the decorative panel from a bottom end thereof.

When the decorative panel is inserted from the insertion opening in this configuration, the decorative panel can be accommodated in a space provided beforehand between the frame and the safety means, whereby it becomes easier to handle the decorative panel.

Though the decorative panel is inserted from the upper face of the frame in the configuration mentioned above, the inserting position may be located at a side face.

Preferably, in the gaming machine of the present invention, a shaft is attached to the cabinet, whereas one end of the frame is axially supported by the shaft. This configuration allows the frame to rotate about the shaft, which makes it easier to secure the frame to the cabinet or release the frame from the cabinet.

Preferably, the gaming machine of the present invention further comprises a cover, attached to the back face of the frame so as to expose a peripheral part of the one surface of the decorative panel, for covering the light source while having an opening directed to the frame; whereas a space for accommodating the decorative panel is formed between the cover and the frame; the support means supporting the decorative panel while in a state in contact with only the peripheral part in one surface of the decorative panel. In this configuration, the decorative panel can be accommodated in the space between the cover for covering the light source and the frame, whereby the decorative panel can be prevented from toppling down when securing the frame to the cabinet or releasing the frame from the cabinet.

DESCRIPTION OF THE PREFERRED EMBODIMENTS

In the following, an embodiment of the present invention will be explained with reference to the drawings. Though this embodiment will be explained while employing the present invention in a slot machine, the present invention is not restricted thereto but is employable in various gaming machines such as video gaming machines, medal gaming machines, and card gaming machines.

The configuration of the slot machine in accordance with this embodiment will now be explained.

Figure 1:
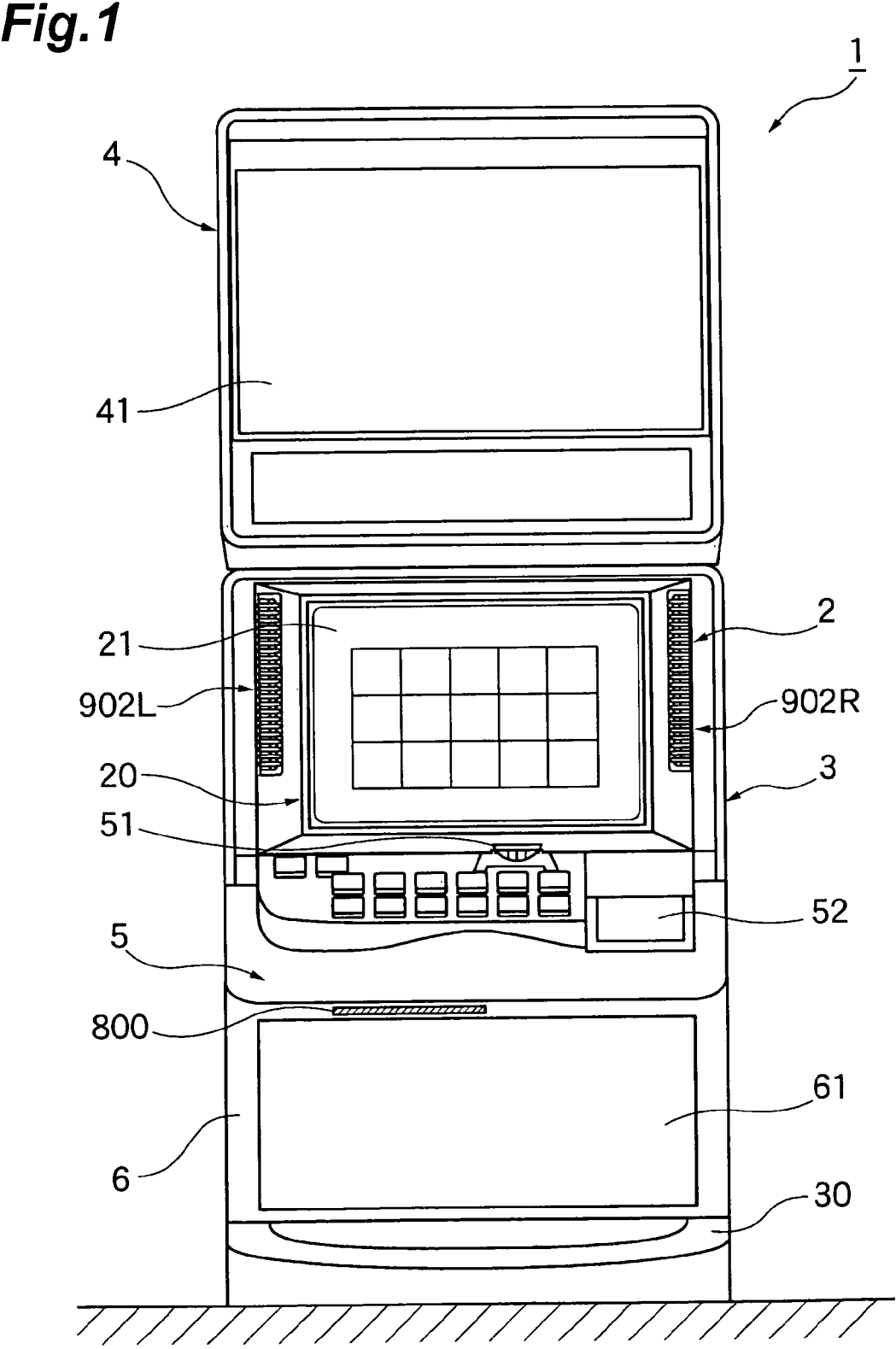
FIG. 1 is a front view of the slot machine in accordance with an embodiment of the present invention.

FIG. 1 is a front view of the slot machine 1. In this specification, words indicating directions will be used with reference to the state shown in FIG. 1. Namely, the state in which the gaming machine 1 stands erect is taken as a reference, and the direction from a cabinet 2 to a top frame 4 is defined as upward. The direction from the gaming machine 1 to a position where a gamer plays a game is defined as forward or front side.

In the gaming machine 1, a door 3 is attached to the cabinet 2 so as to be able to open and close. The top frame 4 is attached to the upper side of the cabinet 2. A decorative panel 41 is provided in front of the top frame 4.

An image display unit 21 for displaying game information is placed within the cabinet 2. In order for the display of the image display unit 21 to be viewable, a window is formed in the upper part of the door 3, whereas a transparent plate for making the display of the image display unit 21 viewable or protecting the image display unit 21 is attached to the window. Formed on both sides of the window are speaker grills for making it easy to hear sound effects or incidental music generated according to states of games.

Disposed at the center part on the front face of the door 3 is a control panel 5 in a projecting form. Namely, the control panel 5 projects forward from the door 3. In the slope on the right side of the control panel 5, various operating buttons are arranged together with a coin slot 51 for inserting coins. Provided on the left side of the control panel 5 is a bill guide 52 for guiding bills into a bill identifier (bill validator) accommodated in the cabinet 2.

Provided below the control panel 5 is a frame 6 connected to the door 3 in a freely opening and closing fashion. The frame 6 incorporates a decorative panel 61 therein. The decorative panel 61 is provided with a decoration indicating the kind of the gaming machine and the like. The decorative panel 41 of the top frame 4 located above the screen of the image display unit 21 is also provided with the decoration in an easily viewable fashion.

Formed below the lower frame 6 at the bottom part of the door 3 is a coin tray 30 for receiving coins.

Figure 2:
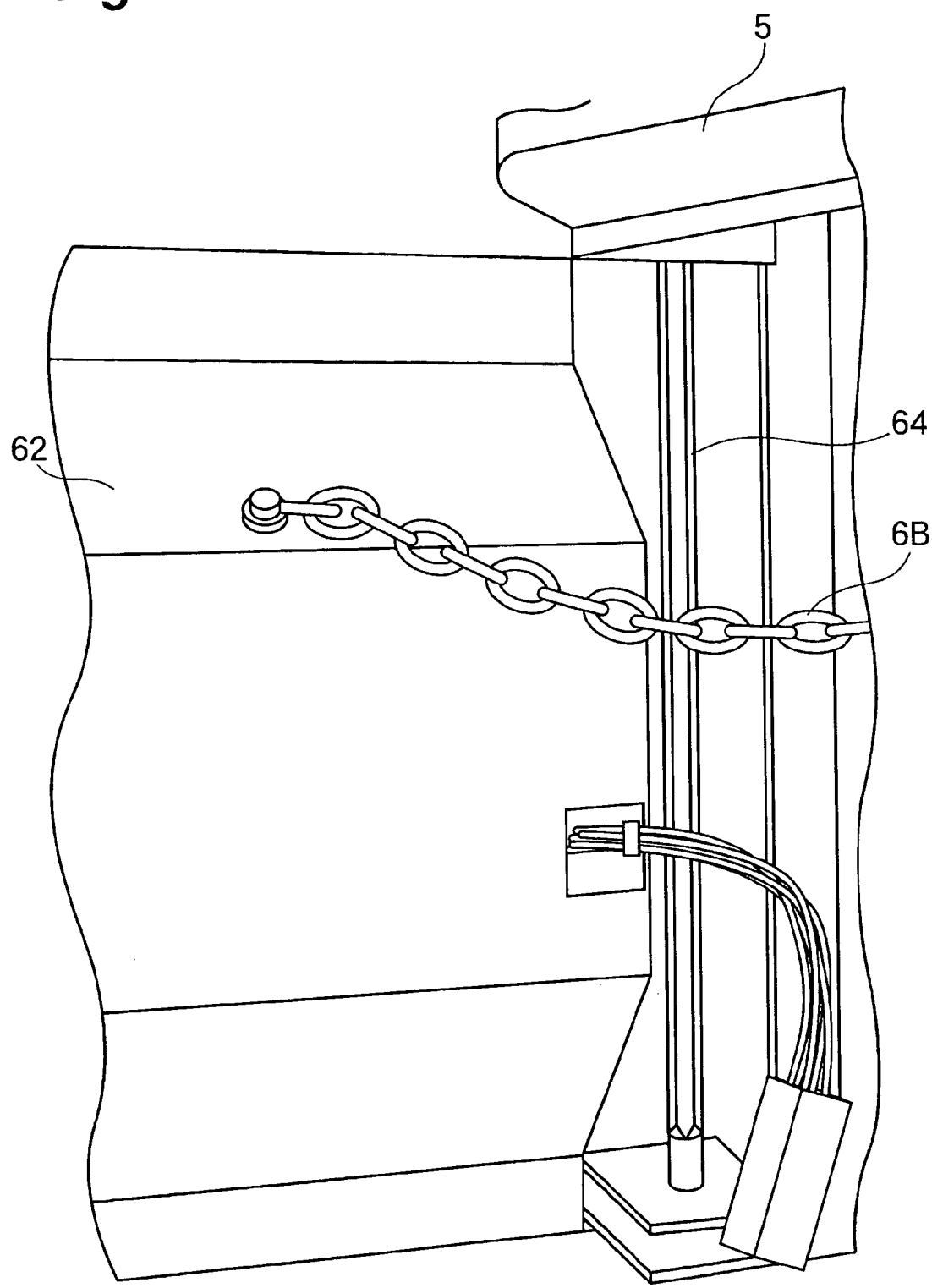
FIG. 2 is a view showing a state where the frame in the embodiment is opened.
Figure 5:
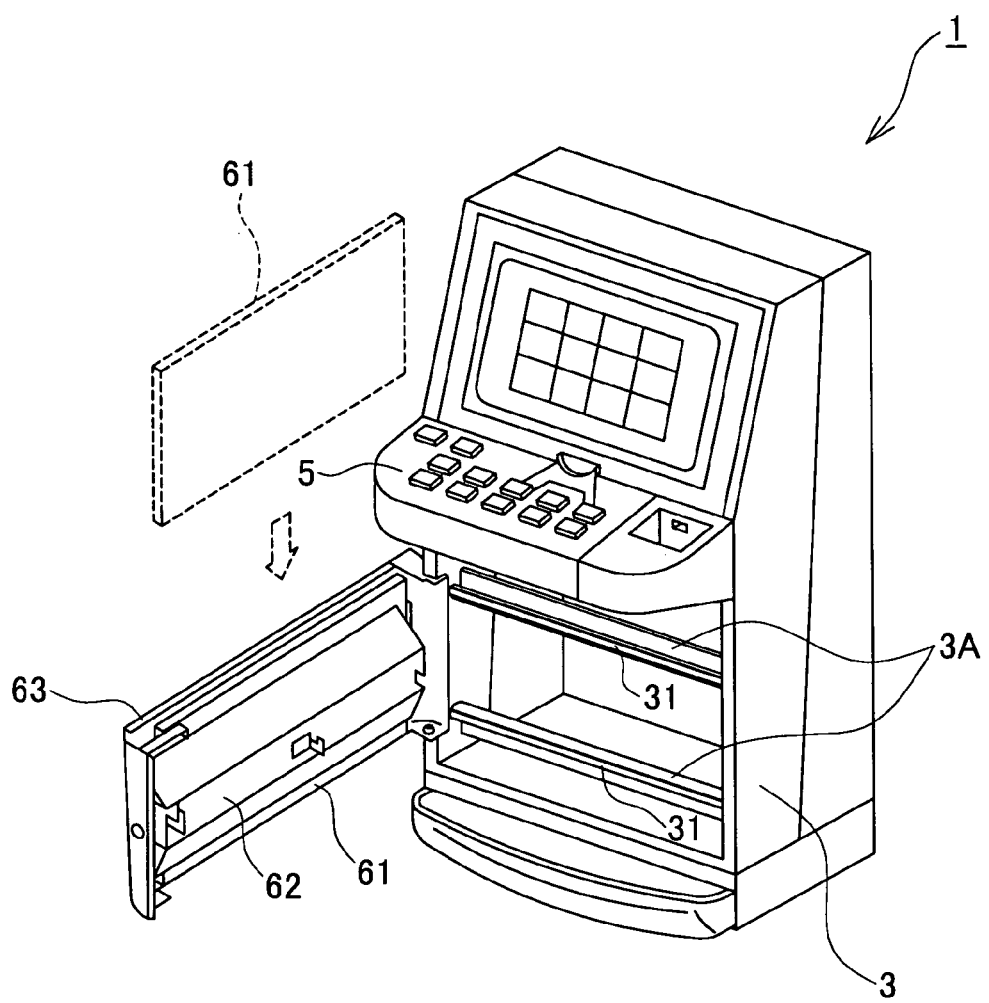
FIG. 5 is a perspective view of the state where the frame in the embodiment is opened.

FIG. 2 is a view showing a state where the frame 6 is opened, the frame 6 being seen from its back face. FIG. 5 is a perspective view showing a state where the frame 6 is opened, the frame 6 being seen from its back face. The top frame 4 is not shown in FIG. 5. A shaft 64 is disposed at the right side of the frame 6, whereby the frame 6 is rotatably connected to the door 3. A cover 62 is attached to the back face of the frame 6 so that the back face is substantially covered therewith.

The upper end of the cover 62 is set such that a support part 3A in the door 3, which will be explained later, can enter. Similarly, the lower end of the cover 62 is set such that a support part 3A in the door 3 can enter. A chain 6B has one end connected to the cover 62, and the other end connected to the door 3. The chain 6B is used for preventing the frame 6 from opening from the door 3 by a predetermined angle or greater.

Figure 3:
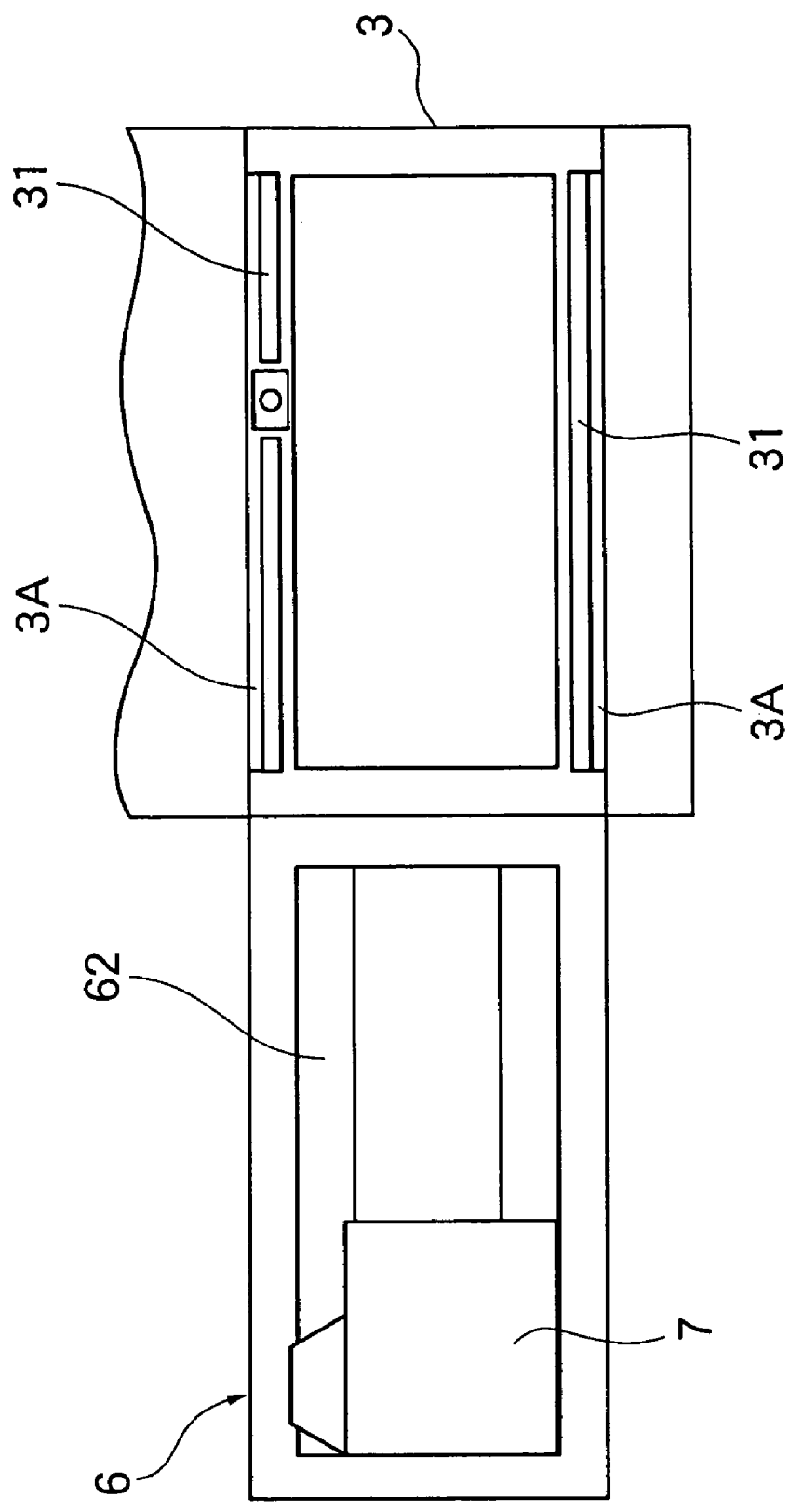
FIG. 3 is a view showing a state where the frame in the embodiment is opened.

FIG. 3 is a view showing a state where the frame 6 is opened. This is a view showing a state where both the door 3 and the frame 6 are seen from behind. As shown in FIG. 3, a pair of support parts 3A bent to project toward the frame 6 are formed in the door 3. A pressing member 31 such as sponge is bonded to each support part 3A, for example. When the frame 6 is closed, the upper face of the frame 6 is placed near the bottom face of the control panel 5.

Figure 4:
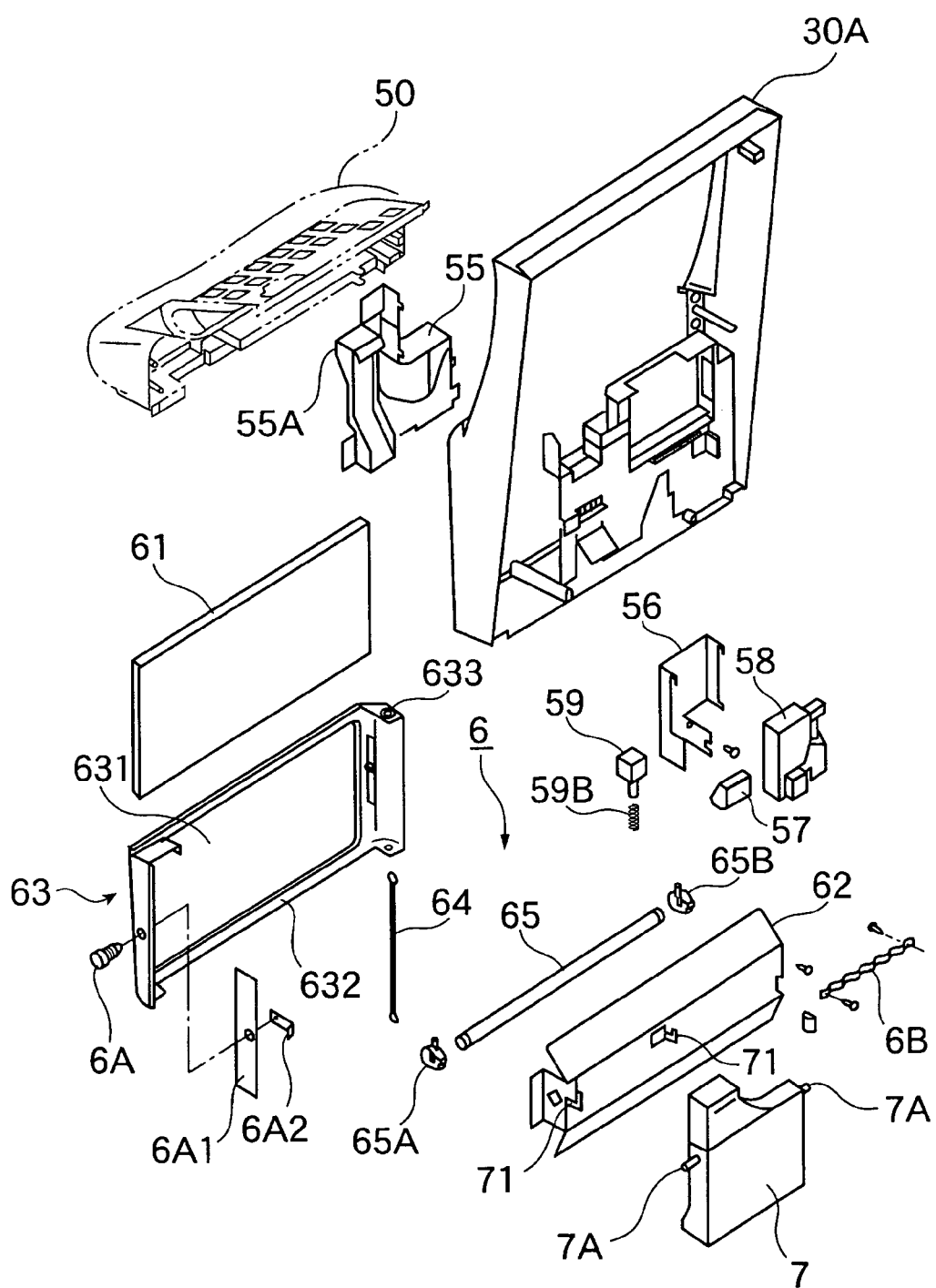
FIG. 4 is an exploded perspective view of the frame in the embodiment.

FIG. 4 is an exploded perspective view of the frame 6. The decorative panel 61 has a rectangular form, and is constituted by a light-transparent glass or synthetic resin material.

The frame includes a frame plate 63. The frame plate 63 comprises a front part disposed so as to support the peripheral part of the surface of the decorative panel 61, right and left sides extending in directions intersecting the front part, and an edge 632 extending from the bottom end of the front part into a direction intersecting the front part. The upper end of the frame plate 63 is formed with an insertion opening for inserting the decorative panel 61.

The frame plate 63 is integrally formed from a lightweight metal material or a hard lightweight synthetic resin material. The decorative panel 61 is accommodated in a space between the sides of the frame plate 63. A window 631 is formed in the front part of the frame plate 63 so that the decoration of the decorative panel 61 is visible when the decorative panel 61 is accommodated in the frame plate 63. For preventing the decorative panel 61 from dropping out, the edge 632 extends from the frame plate 63 at the bottom part thereof.

A plate 6A1 for securing a cylinder lock 6A to the frame plate 63 is disposed at the left side of the frame plate 63. Connected to the terminating end of the rotary shaft of the cylinder lock 6A is a stopper 6A2 for locking the frame 6 to the door 3. A through hole 633 is formed in the right side of the frame plate 63. A shaft 64 is inserted into the through hole 633, whereby the frame plate 63 is rotatably connected to the door 3.

The cover 62 is fixed to the frame plate 63. A pair of sockets 65A, 65B are attached to the inner wall of the cover 62, whereas a fluorescent lamp 65 is attached to the sockets 65A, 65B. In the state where the cover 62 is attached to the frame plate 63, a gap in which the thickness of the decorative panel 61 can just be inserted is formed between the inner face of the cover 62 and the back wall of the frame plate 63.

Specifically, the cover 62 covers the fluorescent lamp 65 while having an opening directed to the back face of the frame plate 63. When the frame 6 is secured to the door 3, the fluorescent lamp 65 is located within the door 3. A gap for accommodating the decorative panel 61 is formed between the cover 62 and the frame plate 63. The decorative panel 61 accommodated in the space has a rear face for receiving the light from the fluorescent lamp 65 and a front face for emitting thus received light. The cover 62 is attached to the back face of the frame 63 so as to expose the upper and lower end parts of the back face of the decorative panel 61.

Effects will now be explained.

As explained in connection with FIG. 4, the edge 632 for preventing the decorative panel 61 from dropping out extends from the bottom part of the frame plate 63. In the state where the cover 62 is attached to the frame plate 63, a gap in which the thickness of the decorative panel 61 can just be inserted is formed between the inner face of the cover 62 and the back wall of the frame plate 63. In the state where the frame 6 is closed, the bottom face of the control panel 5 prevents the decorative panel 61 from projecting. The foregoing configuration generates a state in which the decorative panel 61 is accommodated in the frame 6. Namely, the frame plate 63 accommodates, together with the cover 62 attached thereto, the decorative panel 61, thereby preventing the decorative panel plate 61 from dropping out and toppling down.

However, the decorative panel 61 is not completely secured by the foregoing alone, but is in an unstable state. In this embodiment, when the frame 6 is locked to the door 3, the pair of pressing members 31 bonded to the support parts 3A of the door 3 press the upper and lower peripheral parts in the rear face of the decorative panel 61. When the rear face of the decorative panel 61 is pressed by the pressing members 31, peripheral parts in the front face of the decorative panel 61 come into contact with the back face of the frame plate 63. Then, the support parts 3A of the door 3 and the frame plate 63, with the pressing members 31 interposed therebetween, hold and support the decorative panel 61 therebetween. As such, the decorative panel 61 is placed in a stable state. Here, the support parts 3A of the door 3 and the pressing members 31 constitute support means.

In a state where the frame 6 is opened (unlocked state), on the other hand, the decorative panel 61 attains a free state, which makes it easier for the decorative panel 61 to be pulled out from the upper side. Though the decorative panel 61 can be inserted/pulled from the upper side of the frame plate 63, a side face of the frame plate 63 may be opened such that the decorative panel 61 can be inserted in/pulled out sideways.

When the frame 6 is locked to the door 3, on the other hand, the pressing members 31 bonded to the support parts 3A of the door 3 press the peripheral parts of the decorative panel 61 in the vicinity of the bottom face thereof as mentioned above. Namely, the configuration that "the support means supports the decorative panel while in a state in contact with only a peripheral part of the decorative panel" makes it possible to support the decorative panel 61 from behind at only the peripheral part thereof, whereby functions of the decorative panel can fully be exhibited without blocking the light illuminating the decorative panel from the fluorescent panel 65. The light irradiating means is not limited to the fluorescent lamp. Any light illuminating means can be used as long as the decorative panel is illuminated from inside thereby.

In a state where the decorative panel 61 is removed from the frame plate 63, it becomes easier to replace the fluorescent lamp, since the window 631 of the frame plate 63 is open widely.

In the configuration of FIG. 4, the cover 62 is constituted by a silver-colored material such as aluminum, so that the back scattering light of the fluorescent lamp 65 is reflected toward the decorative panel 61, which is effective in that the decorative panel 61 becomes brighter than in the case with no reflection by the cover 62.

Further, the decorative panel 41 of the top frame 4 is brightly illuminated with an internal light source, whereby the existence of the slot machine 1 is shown up by the light-emitting screen of the display unit 21 as well as effects of the decorative panels 41, 61 disposed thereabove and thereunder.

What is claimed is:

1. A gaming machine comprising:
   a cabinet;
   a light source;
   a decorative panel, disposed in front of the light source, including a first surface on which light from the light source is incident;
   support means, provided within the cabinet, for supporting the decorative panel at the first surface;
   a frame, detachably attached to the cabinet, including a back face for supporting the decorative panel at a second surface of the decorative panel, opposite the first surface, when the frame is secured to the cabinet; and
   a cover attached to the back face of the frame, exposing a peripheral part of the first surface of the decorative panel, covering the light source, and having an opening directed toward the frame, wherein a space for accommodating the decorative panel is located between the cover and the back face of the frame.

2. The gaming machine according to claim 1, wherein the support means supports the decorative panel while contacting only a peripheral part of the first surface of the decorative panel.

3. The gaming machine according to claim 1, wherein the frame further comprises panel safety means, disposed at a position opposing a bottom end of the decorative panel, for preventing the decorative panel from dropping out of the frame.

4. The gaming machine according to claim 3, wherein the frame includes an insertion opening for receiving the decorative panel from a bottom end of the decorative panel.

5. The gaming machine according to claim 3, including a shaft attached to the cabinet, wherein one end of the frame is supported by the shaft for rotation of the frame about the shaft.

6. A gaming machine comprising:
   a cabinet;
   a light source;
   a decorative panel, disposed in front of the light source, including a first surface on which light from the light source is incident;

a frame, detachably attached to the cabinet, including a back face for supporting the decorative panel at a second surface of the decorative panel, opposite the first surface, when the frame is secured to the cabinet;

a resilient support located within and projecting outwardly toward the decorative panel, for supporting the decorative panel at the first surface when the frame is secured to the cabinet; and a cover attached to the back face of the frame, exposing a peripheral part of the first surface of the decorative panel, covering the light source, and having an opening directed toward the frame, wherein a space for accommodating the decorative panel is located between the cover and the back face of the frame.

7. The gaming machine according to claim 6, wherein the resilient support supports the decorative panel while contacting only a peripheral part of the first surface of the decorative panel.

8. The gaming machine according to claim 6, wherein the frame further comprises a projecting bottom flange, disposed at a position opposing a bottom end of the decorative panel, for preventing the decorative panel from dropping out of the frame.

9. The gaming machine according to claim 7, wherein the frame includes an insertion opening for receiving the decorative panel from a bottom end of the decorative panel.

10. The gaming machine according to claim 7, including a shaft attached to the cabinet, wherein one end of the frame is supported by the shaft for rotation of the frame about the shaft.

* * * * *